UNITED STATES PATENT OFFICE.

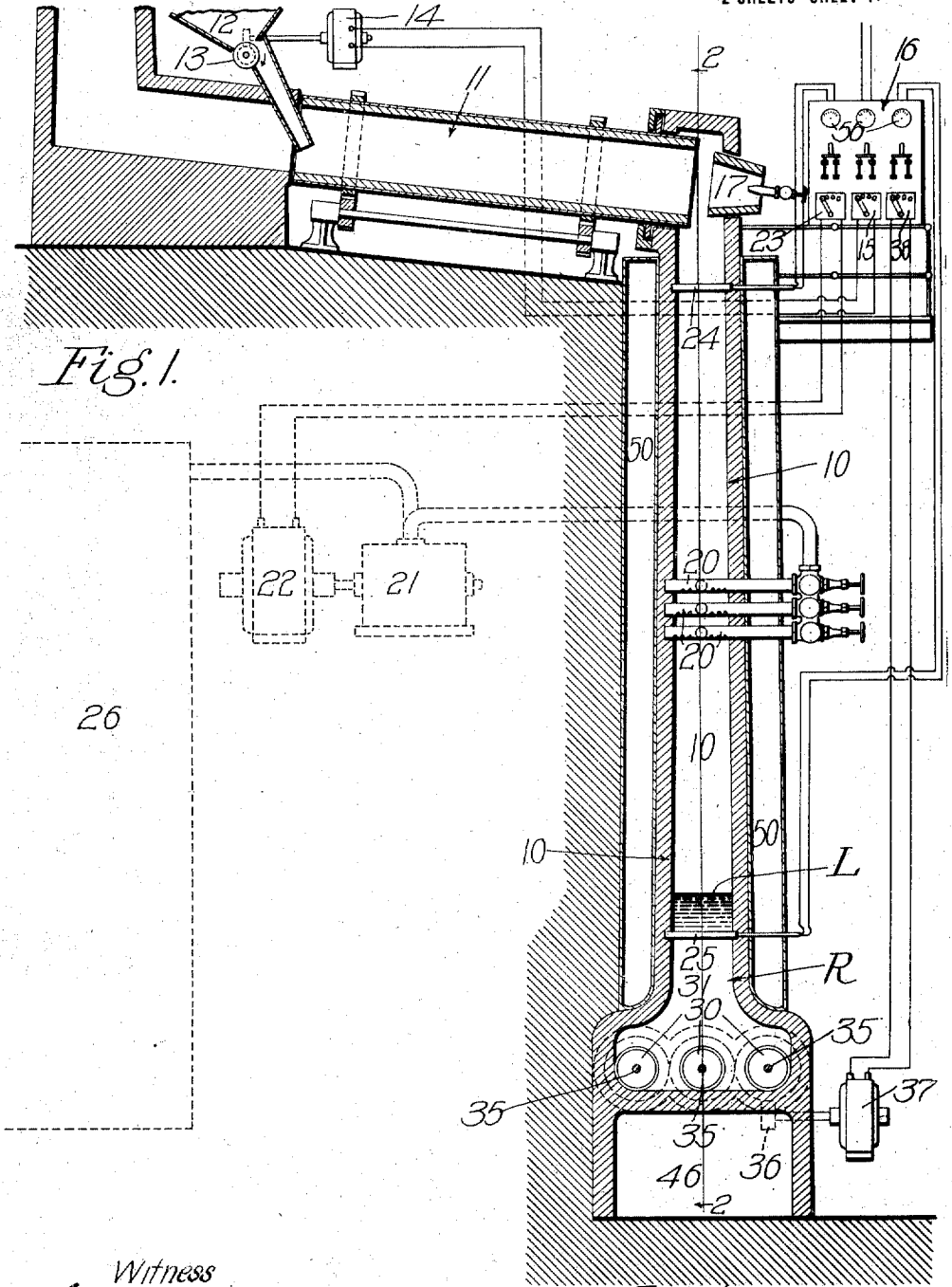

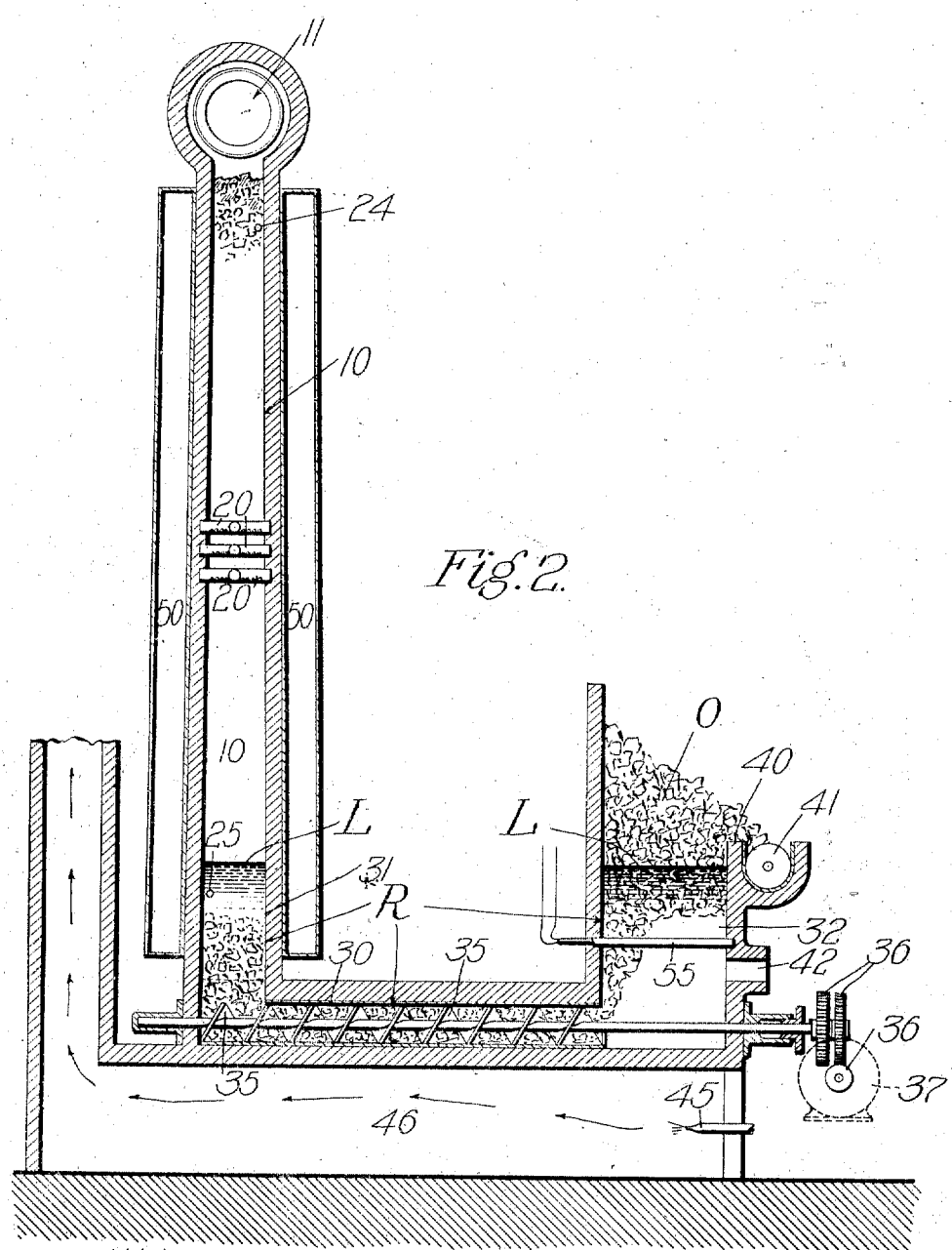

HARMON N. TRACY, OF LOS ANGELES, CALIFORNIA.

APPARATUS FOR REDUCING AND METALLIZING ORES.

1,214,844.  Specification of Letters Patent. Patented Feb. 6, 1917.

Application filed October 12, 1915. Serial No. 55,527.

*To all whom it may concern:*

Be it known that I, HARMON N. TRACY, a citizen of the United States, residing at Los Angeles, in the county of Los Angeles, State of California, have invented new and useful Improvements in Apparatus for Reducing and Metallizing Ores, of which the following is a specification.

This invention relates to apparatus for reducing ores, such as in the manner set forth in my application Serial No. 23,548, filed April 24th, 1915, and for metallizing such ores. Although this invention relates more particularly and specifically to the metallizing of ores; that is, to the gathering of the metal from the metal of the ore into one body of metal and of separating the spent ore from the metal; yet the invention also relates to apparatus for the reduction and metallizing of ore in immediate sequence.

The features of my invention, and of the method which I put into effect with my apparatus, will be best understood from the following detailed specification. In this specification I set forth what I now consider a preferred form of my invention, and illustrate the same in the accompanying drawings, in which Figure 1 is a vertical section and diagram of my apparatus, and Fig. 2 is a section taken as indicated by line 2—2 of Fig. 1.

For the reducing action in my method I prefer to use the apparatus set forth in my application above referred to. I utilize a suitable vertical narrow stack 10 which receives ore at its upper end from a roasting drum 11, to which ore is fed from bin 12 by a feeder 13 operated from motor 14 which may be controlled from switch 15 on the switch board 16. The heat for roasting is supplied from a burner 17. The parts described are substantially the same as are described in my prior application. Reducing gases are fed in through any or all of the pipes 20 situated about centrally in the stack 10, the reducing gases being supplied under pressure, from a blower 21, taking gas from a tank or the like 26, and operated from motor 22, which may be controlled at 23 on the switch board 16. Pyrometers 24 and 25 may be arranged to give indications of the temperatures at the top and bottom of the stack. Reduction takes place throughout a zone in the central part of the stack around the pipes 20; and the ore below this central reduction zone carries reduced metal; that is, carries metal in more or less finely divided form commingled with the body of the ore.

It is one of the direct objects of this invention to provide a means and a method of separating and accumulating this metal out of the body of the ore and of then separating the spent ore from the body of accumulated metal.

At the bottom of the stack 10 there is a liquid metal reservoir R which is preferably made in the configuration shown in Figs. 1 and 2. This liquid metal reservoir R has a horizontal portion 30 and two vertical legs 31 and 32, the vertical leg 31 forming in this case, a direct continuation of the stack 10; so that the downwardly moving ore is discharged directly from the lower end of the stack into this vertical leg 31 of the liquid metal reservoir R. Or, as a matter of explanation, it might be said that the lower part of the stack forms in itself the vertical leg of the liquid reservoir R. The horizontal portion 20 of this reservoir may take the form of one or more cylindrical tunnels or passages each adapted to contain a spiral conveyer 35. These spiral conveyers may be operated by means of suitable gears 36 from a motor 37 controlled from 38 on the switch board 16. These spiral conveyers have two particular functions. One function is to controllably move, or to control the movements of, the ore through the liquefied metal in the reservoir R, said movement being so controlled that the ore is passed through the liquefied metal for a sufficient time period to expose all of the reduced metallic particles of the ore to the liquid metal; and another function is to agitate or mull the ore over and over so that all parts of it are exposed. The other vertical leg 32 of the liquid metal reservoir R is what I may term the outlet and separating leg. When the ore reaches the end of the horizontal portion 30 it immediately floats upwardly through the liquefied metal and a mass of the ore will float in and above the surface portions of the liquefied metal. The liquid level is kept at a point shown at L; and one of the walls of the vertical leg 32 has an overflow edge 40 just slightly above the liquid level L; so that the mass of ore O which is floated above the level of the liquid will flow or spill over the edge 40, and may be removed in any desired manner, as by conveyer 41. The liquefied metal may be removed in any suitable manner as at the spout 42; the metal being removed in such quantity as to keep the liquid level at or near the point illustrated.

The liquid in the reservoir may be kept in liquid condition by applied heat, if such is necessary, from a burner 45 operating in a furnace 46 below the reservoir R. The amount of heat and temperature necessary depends, of course, upon the nature of the metal being handled.

I may now illustrate the operation of my device. Supposing that a lead and silver ore is being reduced and metallized. The ore is roasted in the drum 11, being thereby oxidized; and then passes down through stack 10, being reduced in the reduction zone near the center of the stack. The reduced ore then passes on down the stack and enters the liquefied metal at the bottom of the stack, the ore being forced down through the liquefied metal to the conveyers 35 by the weight of superincumbent ore in the stack. In the particular case in hand, I will say that the specific gravity of the ore is about two and five tenths while that of a mixture of liquefied lead and silver is about eleven. The buoyancy of the ore in the liquefied metal would then be represented by the figure eight and five tenths; and the ratio of buoyancy to weight of the ore would be about seventeen to five. I so design the apparatus that the column of ore above the liquid level has sufficient weight to not only force the ore down through the liquefied metal to the conveyer 35 but also to cause continued movement of the ore toward the conveyers 35. The conveyers 35 feed the ore at a determined speed through the metal and feed it out at the ends of the conveyers into a vertical leg 32. Here the ore floats toward the surface and accumulates in the floating mass which is delivered from the leg 32 in the manner specified.

It may or may not be that the reduced lead and silver in this particular case, will be at a melting temperature when they reach the liquefied metal at the level L. If they are not at or above the temperature of liquefaction the heat from burner 45 supplies the heat necessary to liquefy the individual fine particles of reduced metal. As the ore enters the liquefied metal and travels therethrough, and as it is agitated and mulled by the conveyers 35, the more or less fine particles of metal merge into the large body of liquefied metal. The ore which accumulates in the mass O has there been deprived of its metallic contents.

With some ores the temperature necessary for reduction may be sufficient for liquefying the metal; and in such cases, if the temperature is maintained, it is not necessary to supply heat below the liquid reservoir R. The heat developed during reduction and the heat from the roasting drum 11 may be conserved by a jacket 50 in which a vacuum, more or less complete, may be maintained. By thus heat insulating the stack I provide for keeping up the ore temperature; losing little of the roasting heat on passage from the roaster to the reduction zone and little of the reduction heat on passage from the reduction zone to the liquefied metal below. Conservation of the heat tends to minimize the amount of heat required to be furnished to the liquefied metal. The temperatures at the top and bottom of the stack are indicated by the pyrometers 24 and 25; and the temperature in the vertical leg 32 may be indicated by the pyrometer 55. These pyrometers may register at 56 on the switch board 16. The temperatures may be kept at the desired points by suitably operating the burners. The complete plant having been designed to suit any particular ore, say lead and silver, the operation is as hereinbefore indicated. The stack is kept continuously full and the rate of discharge through the liquefied metal is such as to give the requisite time period in the reduction zone and also the correct time period in the liquefied metal.

Having described a preferred form of my invention, I claim:

1. Apparatus of the character described, embodying a vertical ore reducing stack into whose upper end ore is fed, a liquid metal reservoir at the bottom of the stack, said reservoir embodying a horizontal portion with a vertical arm at each end, one vertical arm being a direct continuation of the stack so that reduced ore from the stack moves downwardly directly into the said vertical arm of the liquid metal reservoir, means to move the ore through the horizontal portion of the reservoir, and means at the top of the other vertical arm for removing the spent ore, said reservoir being adapted to hold molten metal to a level above the horizontal portion, so that the ore is completely submerged in the molten metal when it is carried through the horizontal portion.

2. Apparatus of the character described, embodying a vertical ore reducing stack into whose upper end ore is fed, a liquid metal reservoir at the bottom of the stack, said reservoir embodying a horizontal portion with a vertical arm at each end, one vertical arm being a direct continuation of the stack so that reduced ore from the stack moves downwardly directly into the said vertical arm of the liquid metal reservoir, means to move the ore through the horizontal portion of the reservoir embodying a spiral conveyer, and means at the top of the other vertical arm for removing the spent ore, said reservoir being adapted to hold molten metal to a level above the horizontal portion, so that the ore is completely submerged in the molten metal when it is carried through the horizontal portion.

3. Apparatus of the character described, embodying a vertical ore reducing stack into whose upper end ore is fed, a liquid metal reservoir at the bottom of the stack, said reservoir embodying a horizontal portion with a vertical arm at each end, one vertical arm being a direct continuation of the stack so that reduced ore from the stack moves downwardly directly into the said vertical arm of the liquid metal reservoir, means to move the ore through the horizontal portion of the reservoir embodying a spiral conveyer, and means at the top of the other vertical arm for removing the spent ore, embodying a wall of the arm slightly above the surface of the liquid ore so that the ore floating in and above the liquid may flow over said wall, said reservoir being adapted to hold molten metal to a level above the horizontal portion, so that the ore is completely submerged in the molten metal when it is carried through the horizontal portion.

4. In a device of the character described, a liquid metal reservoir embodying a horizontal portion and a vertical arm rising from each end of the horizontal portion, the reservoir being adapted to hold molten metal to a level in the two arms and above the horizontal portion so that the horizontal portion is completely filled with liquid metal, means to introduce ore to one of the vertical arms, means to move the ore through the horizontal portion, and means to cause the discharge of the spent ore from the other vertical arm embodying a wall of said arm being low so that the upper parts of the mass of ore floating in and above the liquid in that arm may flow over said wall.

5. In a device of the character described, a liquid metal reservoir embodying a substantially horizontal portion and vertically extending arms one at each end of the horizontal portion, one of said arms being extended to considerable height, and the reservoir being adapted to hold molten metal to a level up in the arms above the horizontal portion, so that the weight of a column of ore in the said high arm is sufficient to force the ore beneath the surface of the molten metal in that arm down to the horizontal portion of the reservoir, and means to cause discharge of the spent ore from the other arm of the reservoir.

6. In a device of the character described, a liquid metal reservoir embodying a substantially horizontal portion and vertically extending arms one at each end of the horizontal portion, one of said arms being relatively high and the other relatively low, the reservoir being adapted to contain molten metal to a level up in the arms above the horizontal portion, means to feed ore to the high arm, and means to discharge ore from the low arm.

7. In a device of the character described, a liquid metal reservoir embodying a substantially horizontal portion and vertically extending arms one at each end of the horizontal portion, one of said arms being extended to considerable height, and the reservoir being adapted to hold molten metal to a level up in the arms above the horizontal portion, so that the weight of a column of ore in the said high arm is sufficient to force the ore beneath the surface of the molten metal in that arm down to the horizontal portion of the reservoir, means to move the ore through the horizontal portion of the reservoir, and means to cause discharge of the spent ore from the other arm of the reservoir.

In witness that I claim the foregoing I have hereunto subscribed my name this 5th day of October 1915.

H. N. TRACY.

Witness:
    Elwood H. Barkelew.